US009438152B2

(12) United States Patent
Chabaud et al.

(10) Patent No.: US 9,438,152 B2
(45) Date of Patent: Sep. 6, 2016

(54) ELECTRONICALLY COMMUTATED ELECTRIC MOTOR COMPRISING ROTOR POSITION DETECTION WITH INTERFERENCE FIELD COMPENSATION

(75) Inventors: Antoine Chabaud, Tamm (DE); Martin Frey, Lichtenstein (DE); Sven Finke, Stuttgart (DE); Frank Sader, Königstein (DE); Markus Vogel, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 408 days.

(21) Appl. No.: 14/110,889

(22) PCT Filed: Apr. 11, 2012

(86) PCT No.: PCT/EP2012/056539
§ 371 (c)(1),
(2), (4) Date: Feb. 27, 2014

(87) PCT Pub. No.: WO2012/140053
PCT Pub. Date: Oct. 18, 2012

(65) Prior Publication Data
US 2014/0197766 A1    Jul. 17, 2014

(30) Foreign Application Priority Data

Apr. 11, 2011  (DE) .................. 10 2011 007 147

(51) Int. Cl.
*H02K 29/08* (2006.01)
*H02P 6/16* (2016.01)
(52) U.S. Cl.
CPC ................ *H02P 6/16* (2013.01); *H02K 11/25* (2016.01); *H02K 29/08* (2013.01)
(58) Field of Classification Search
USPC .......... 318/400.38, 400.39, 602, 400.4, 652, 318/721; 324/750.16, 207.2, 117 H
See application file for complete search history.

(56) References Cited

U.S. PATENT DOCUMENTS

| 7,049,776 B2 * | 5/2006 | Hornberger ............... H02P 6/16 318/400.04 |
| 8,901,862 B2 * | 12/2014 | Chabaud .................. H02P 6/18 318/400.02 |

(Continued)

FOREIGN PATENT DOCUMENTS

| CN | 101803158 A | 8/2010 |
| CN | 101877524 A | 11/2010 |

(Continued)

OTHER PUBLICATIONS

International Search Report corresponding to PCT Application No. PCT/EP2012/056539, mailed Dec. 12, 2012 (German and English language document) (5 pages).

(Continued)

*Primary Examiner* — Jorge L Carrasquillo
(74) *Attorney, Agent, or Firm* — Maginot, Moore & Beck LLP

(57) ABSTRACT

An electronically commutated electric motor includes a stator and a rotor formed as a permanent magnet. A control unit is connected to the stator and configured to energize the stator to produce a rotating magnetic field. The electric motor further includes at least one Hall sensor configured to detect at least a magnitude of a sensor magnetic field produced by a sensor magnet connected to the rotor. The electric motor also includes at least one magneto resistive sensor configured to detect an alignment of a total magnetic field during a rotor revolution of the rotor and to generate a rotor position signal representing this alignment. The total magnetic field includes the sensor magnetic field and an interference magnetic field superimposed thereon. The control unit is further configured to determine the rotor position of the rotor at least depending on the alignment of the total magnetic field.

15 Claims, 3 Drawing Sheets

(56) References Cited

U.S. PATENT DOCUMENTS

| | | |
|---|---|---|
| 2003/0016027 A1 | 1/2003 | McMahon et al. |
| 2005/0067996 A1* | 3/2005 | Eba .................. G05B 19/19 |
| | | 318/609 |
| 2005/0073292 A1 | 4/2005 | Hastings et al. |
| 2007/0101596 A1* | 5/2007 | Olson .................. G01C 17/38 |
| | | 33/356 |
| 2009/0230824 A1 | 9/2009 | Hornberger et al. |
| 2010/0201351 A1 | 8/2010 | Clymer |

FOREIGN PATENT DOCUMENTS

| | | |
|---|---|---|
| DE | 103 59 713 A1 | 7/2004 |
| DE | 10 2006 055 305 A1 | 6/2007 |
| DE | 10 2007 052 131 A1 | 5/2008 |
| DE | 10 2009 028 170 A1 | 2/2011 |
| EP | 1 624 557 A1 | 2/2006 |
| EP | 1 670 121 A1 | 6/2006 |

OTHER PUBLICATIONS

Infineon Technologies; Uni- and Bipolar Hall IC Switches for Magnetic Field Applications; Data Sheet; Jul. 1, 2000; 15 Pages.

* cited by examiner

ELECTRONICALLY COMMUTATED ELECTRIC MOTOR COMPRISING ROTOR POSITION DETECTION WITH INTERFERENCE FIELD COMPENSATION

This application is a 35 U.S.C. §371 National Stage Application of PCT/EP2012/056539, filed on Apr. 11, 2012, which claims the benefit of priority to Serial No. DE 10 2011 007 147.4, filed on Apr. 11, 2011 in Germany, the disclosures of which are incorporated herein by reference in their entirety.

BACKGROUND

The disclosure relates to an electronically commutated electric motor. The electrically commutated electric motor comprises a rotor, which is embodied in particular as a permanent magnet rotor, and a stator. The electric motor also comprises a control unit that is connected to the stator. The control unit is embodied for the purpose of energizing the stator in order to generate a rotating magnetic field.

In the case of electric motors that are known in the prior art, Hall sensors are known for ascertaining a rotor position, wherein the electric motor can be controlled in dependence upon the rotor position in order to rotate the rotor.

SUMMARY

In accordance with the disclosure, the electric motor comprises at least one Hall sensor that is embodied for the purpose of ascertaining at least one magnitude of the sensor magnetic field that is generated by a sensor magnet that is connected to the rotor in particular in the currentless state of the stator. It is further preferred that the electric motor comprises at least one magnetoresistive sensor that is embodied for the purpose of ascertaining an alignment of a total magnetic field during a rotor revolution of the rotor and for the purpose of generating a rotor position signal that represents said alignment, wherein the total magnetic field comprises the sensor magnetic field and an interference magnetic field that is superimposed on said sensor magnetic field.

The control unit is connected at the input side to the rotor position sensors. The control unit is embodied for the purpose of ascertaining the rotor position of the rotor at least in dependence upon the alignment of the total magnetic field, at least of a previously stored magnitude of the sensor magnetic field and a magnitude and an alignment of an interference magnetic field that is generated at least by electrical components of the electric motor. Thus, for the purpose of ascertaining the rotor position, it is advantageously possible to ascertain a precise alignment of the sensor magnetic field by means of a vector calculation.

The magnitude of a magnetic field is preferably the magnitude of a magnetic flux density of the magnetic field.

The magnetoresistive sensor is for example a CMR sensor (CMR=colossal magnetoresistive), an AMR sensor (AMR=anisotropic magnetoresistive), a GMR sensor (GMR=giant magnetoresistive) or a TMR sensor (TMR=tunneling magnetoresistive). The rotor position signal of the magnetoresistive sensor is also referred to hereinunder as an XMR rotor position signal.

For this purpose, the interference magnetic field can be stored for example in the form of an interference magnetic field vector—in particular in the form of a vectorial phasor in a complex form—in a storage device of the control unit. It is further preferred that during a rotor revolution, in particular in a currentless state of the stator, a magnitude or in addition an alignment of the sensor magnetic field can be ascertained by the Hall sensor and can be stored in the form of a sensor magnetic field vector in the storage device. During an operation of the electric motor, in particular during an energized operating mode of the electric motor, it is then possible to ascertain by means of the magnetoresistive sensor the previously mentioned alignment of the total magnetic field. The total magnetic field represents the superposition of the interference magnetic field onto the sensor magnetic field.

It is preferred that the control unit is embodied for the purpose of ascertaining by means of vector addition the alignment of the sensor magnetic field in dependence upon the alignment of the total magnetic field and an alignment and a magnitude of the interference magnetic field and a previously stored magnitude of the sensor magnetic field.

In a preferred embodiment, the electric motor comprises at least a further Hall sensor. The further Hall sensor is embodied for the purpose of ascertaining the rotor position and for the purpose of generating a further rotor position signal that represents the rotor position, which rotor position signal represents at least a magnitude or in addition an alignment of the sensor magnetic field.

It is preferred that the Hall sensor and the further Hall sensor are arranged offset with respect to each other in the direction of the rotor revolution. It is further preferred that the Hall sensor and the further Hall sensor are arranged in an orthogonal manner offset with respect to each other in the direction of the rotor revolution. The offset arrangement and/or the orthogonally offset arrangement of the Hall sensors renders it possible to ascertain the rotor position in an advantageously precise manner, insofar as that in the event of a sinusoidal embodiment the rotor position signals can be evaluated at a point in time when the respective rotor position signal demonstrates a largest temporal change.

In an advantageous manner, it is possible by means of the Hall sensor to expand a detection range of the magnetoresistive sensor to a full rotor revolution, in particular 360 degrees, if the detection range of the magnetoresistive sensor amounts to only half a rotor revolution, in particular 180 degrees.

In a further advantageous manner, it is possible in addition to ascertaining the angle of the magnetoresistive sensor to also ascertain the magnetic flux density, in particular a magnitude of a magnetic flux density of the sensor magnetic field.

The Hall sensor is for example a linear Hall sensor that is embodied for the purpose of generating an analogue output signal.

In a preferred embodiment, the Hall sensor and/or the further Hall sensor is a temperature-compensated Hall sensor, wherein the temperature-compensated Hall sensor is embodied for the purpose of generating in particular a digital Hall sensor signal as an output signal independent of a temperature of the temperature-compensated Hall sensor. A digital Hall sensor signal is for example a pulse width modulated signal or an SPI signal (SPI=serial peripheral interface). Thus, the rotor position can be generated in an advantageous manner independently of the temperature, so that the precise rotor position can be advantageously ascertained even in the case of a warm electric motor or when operating the electric motor at minus temperatures of less than zero degrees Celsius.

It is preferred that the Hall sensor is a linear Hall sensor that is embodied for the purpose of generating an analogue output signal and that the further Hall sensor is a temperature-compensated Hall sensor that is embodied for the purpose of generating a digital output signal. The output signals of the Hall sensors represent in each case a magnitude in particular a magnitude of a magnetic flux density of the sensor magnetic field that is ascertained by the Hall sensor.

It is preferred that the control unit is embodied for the purpose of generating a total Hall sensor signal from the rotor position signals of the Hall sensor and of the further Hall sensor, and the sensor magnetic field is embodied for the purpose of ascertaining in particular the magnitude and the alignment of the sensor magnetic field in dependence upon the total Hall sensor signal. It is preferred that the total Hall sensor signal is a quadrature signal wherein in the case of the quadrature signal the Hall sensor and the further Hall sensor are orthogonally offset with respect to each other in the direction of the rotor revolution.

This orthogonal arrangement renders it advantageously possible to ascertain the rotor position in a particularly precise manner by means of the control unit. It is further preferred that the control unit can ascertain the rotor position in dependence upon the XMR rotor position signal or in addition in dependence upon the total Hall sensor signal during an operation of the electric motor. It is thus advantageously possible by means of the total Hall sensor signal to perform an additional process for ascertaining the rotor position, which supplements in a redundant manner the rotor position that is ascertained by means of the magnetoresistive sensor.

In a preferred embodiment of the electric motor, the control unit is embodied for the purpose of ascertaining an alignment or in addition the magnitude of the total magnetic field in dependence upon the total Hall sensor signal, in particular the quadrature signal. Thus, the total magnetic field can be advantageously ascertained by means of two mutually different sensor types and the level of accuracy in ascertaining the rotor position can be improved.

It is preferred that the temperature-compensated Hall sensor comprises an operating voltage that corresponds to an operating voltage of the control unit. Thus, the electric motor advantageously does not require a voltage convertor for generating a separate operating voltage for the Hall sensor.

The disclosure also relates to a method for operating an electronically commutated electric motor, in particular for operating the electric motor of the type described above.

In the case of the method for operating an electronically commutated electric motor, at least one magnitude of a sensor magnetic field that is generated by a sensor magnet that is connected to the rotor is ascertained by means of a Hall sensor in particular in the currentless state of the stator and stored. Furthermore, a total magnetic field is ascertained by means of a magnetoresistive sensor during a rotor revolution and a rotor position signal that represents the alignment is generated, wherein the total magnetic field comprises the sensor magnetic field and an interference magnetic field that is superimposed on said sensor magnetic field, wherein by means of a vector calculation an alignment of the sensor magnetic field is ascertained in dependence upon the ascertained alignment of the total magnetic field, the previously stored magnitude of the sensor magnetic field and a magnitude and an alignment of an interference magnetic field that is generated by electrical components of the electric motor.

It is preferred that in the case of the method that uses a further Hall sensor, the total magnetic field is ascertained and a further Hall sensor signal is generated. A total Hall sensor signal is formed from the Hall sensor signal and the further Hall sensor signal, which total Hall sensor signal represents the sensor magnetic field.

It is preferred that the total Hall sensor signal is a quadrature signal, which represents two Hall sensor signals that are phase-shifted 90° with respect to each other.

BRIEF DESCRIPTION OF THE DRAWINGS

The disclosure is described hereinunder with reference to the figures and further exemplary embodiments. Further advantageous embodiments are evident in the features of the dependent claims and in the features that are described in the figures.

DETAILED DESCRIPTION

Figure 1:
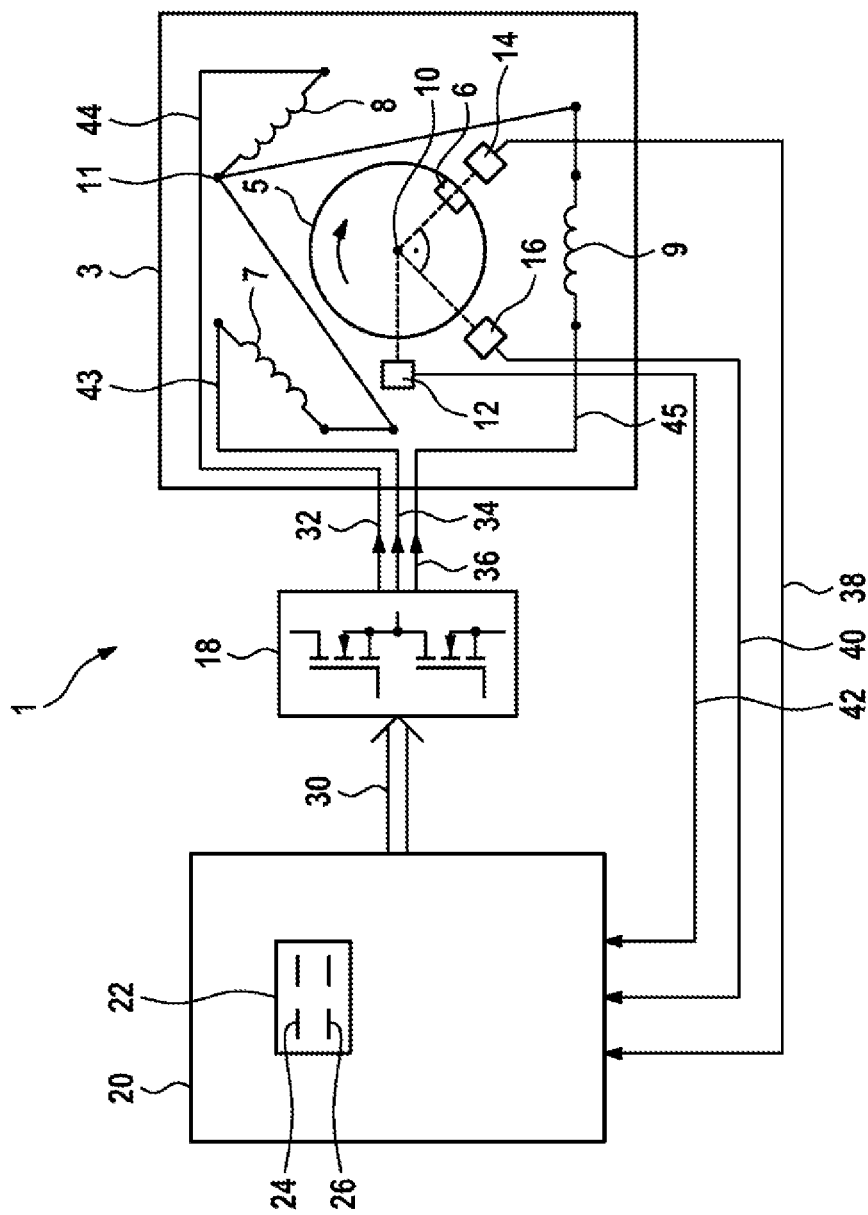
FIG. 1 illustrates an exemplary embodiment for an electronically commutated electric motor, wherein a magnetic interference field can be eliminated during the process of ascertaining a rotor position.

FIG. 1 illustrates an exemplary embodiment for an electronically commutated electric motor 1. The electronically commutated electric motor 1 comprises a rotor 5 that is embodied in particular as a permanent magnet rotor. The rotor 5 is mounted in such a manner as to be able to rotate about an axis of rotation 10. The rotor 5 comprises a sensor magnet 6 that is connected to the rotor 5, which sensor magnet is arranged in such a manner that it is possible by means of at least one Hall sensor, in this exemplary embodiment the Hall sensors 14 and 16, to ascertain a sensor magnetic field that is generated by the sensor magnet 6. The Hall sensor 14 is for example a linear analogue Hall sensor, the Hall sensor 16 is for example a temperature-compensated Hall sensor that is embodied for the purpose of generating in particular a digital output signal that represents the magnetic flux density of a magnetic field that is ascertained by the Hall sensor 16.

The electric motor 1 also comprises a stator 3. The stator 3 comprises stator coils, in this exemplary embodiment three stator coils 7, 8 and 9. The stator coils 7, 8 and 9 comprise in each case a first and a second connector, wherein the second connectors of the stator coils 7, 8 and 9 are mutually connected in an electrical manner by means of a common star-point connection 11.

The stator coil 7 is connected by its first connector by means of a connecting line 43 to an output of a power circuit output stage 18 of the electric motor 1. The stator coil 8 is connected by its first connector by means of a connecting line 44 to the output of the power circuit output stage 18. The stator coil 9 is connected by its first connector by means of a connecting line 45 to the output of the power circuit output stage 18. The power circuit output stage 18 comprises for example two transistor half bridges for each stator coil of the stator. It is also feasible to use a B6 transistor bridge as the power circuit output stage. The transistors are for example in each case IGBT transistors (IGBT=insulated gate bipolar transistor) or FET transistors (FET=field effect transistor), in particular MIS-FET transistors (MIS=metal-insulated semiconductor).

The electric motor 1 also comprises a processing unit 20 that is connected at the output side by way of a multi-channel connection 30 to the power circuit output stage 18. The processing unit 20 is embodied for the purpose of controlling the power circuit output stage 18 by way of the connection 30 for the purpose of energizing the stator coils 7, 8 and 9 in such a manner that it is possible by means of the stator coils 7, 8 and 9 to generate a rotating magnetic field in order to rotate the rotor 5.

The electric motor 1 also comprises a magnetoresistive sensor 12 that—indicated by the broken line—is rotatably connected to the rotor 5. The magnetoresistive sensor 12 is embodied for the purpose of ascertaining a rotor position of the rotor 5, in particular a rotor angular position of the rotor 5 and for the purpose of generating an XMR rotor position signal that represents the rotor position of the rotor and for the purpose of outputting said position signal at the output side by way of a connecting line to the processing unit 20. For this purpose, the magnetoresistive sensor 12 is connected by way of the connecting line 42 to the processing unit 20.

The Hall sensor 14 is connected at the output side by way of a connecting line 38 to the processing unit 20. The Hall sensor 16 is connected at the output side by way of a connecting line 40 to the processing unit 20.

The operating mode of the electric motor 1 is explained hereinunder:

During the operation of the electric motor 1, magnetic interference fields are generated by electrical components for example by the connecting lines 32, 34 and 36 of the electric motor, which magnetic interference fields are superimposed on the magnetic field of the sensor magnet 6. The Hall sensors 14 and 16 are embodied in each case for the purpose of ascertaining the magnetic field of the sensor magnet 6 and for the purpose of generating a corresponding rotor position signal. The processing unit 20 is embodied for the purpose of evaluating the rotor position signals of the Hall sensors 14 and 16 at a point in time when the stator coils 7, 8 and 9 are not in an energized state and for the purpose of ascertaining and storing a magnitude of the sensor magnetic field, in particular a magnitude of the magnetic flux density of the sensor magnetic field. The flux density of the sensor magnetic field can be ascertained by means of the processing unit 20 by means of mathematical rules for complex phasors.

For this purpose, the processing unit 20 can comprise the storage device 22 or can be connected to said storage device.

In this exemplary embodiment, the storage device 22 stores a magnitude and an alignment of an interference magnetic field 24. The interference magnetic field 24 is ascertained for example in dependence upon a mathematical model.

In this exemplary embodiment, the storage device 22 also stores a data set 26. The data set 26 represents a magnitude of the magnetic field of the sensor magnet 6, which magnetic field is ascertained by the Hall sensors and 16. The processing unit 22 can ascertain the magnitude of the sensor magnetic field for example in dependence upon a quadrature signal that is formed from the rotor position signals of the Hall sensors 14 and 16.

The processing unit 20 is embodied for the purpose of ascertaining during an operation of the electric motor 1 the rotor position of the rotor 5 in dependence upon a total field that is ascertained by the magnetoresistive sensor 12, in particular an alignment of the total field, wherein in order to ascertain the rotor position the processing unit 20 is embodied for the purpose of ascertaining the alignment of the sensor magnetic field of the sensor magnet 6 by means of vector summation from the interference field vector that is represented by the data set 24, and the previously stored magnitude of the sensor magnetic field.

It is advantageous if at least one of the Hall sensors 14 and 16 is a temperature-compensated Hall sensor.

Figure 2:
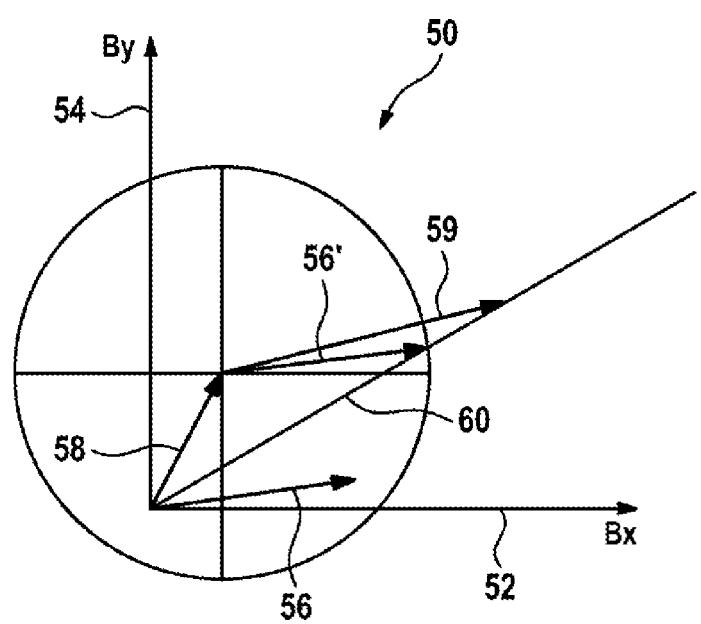
FIG. 2 illustrates a locus plot in which the magnetic inference field and the field of a sensor magnet and a principle of the calculated elimination of the interference field for the purpose of ascertaining the magnetic field of the sensor magnet.

The previously mentioned vectors, in particular the interference field and the magnetic field of the sensor magnet 6 are illustrated hereinunder in FIG. 2 in a locus plot in a complex plane.

FIG. 2 illustrates a locus plot 50 wherein a real part of the magnetic field vectors mentioned in relation to FIG. 1 is plotted on an X-axis 52 and an imaginary part of the magnetic field vectors that are mentioned in the description relating to FIG. 1 is plotted on a Y-axis 54. An angle of the vectors in the complex plane corresponds to a rotor angle of a rotor, a full revolution of the vectors in the complex plane corresponds to a full rotor revolution of the rotor.

The vector 56 represents the magnetic field of the sensor magnet that is illustrated in FIG. 1, in particular a magnetic flux density of the magnetic field of the sensor magnet. The vector 58 represents the magnetic field of the interference field mentioned in FIG. 1. The vector 56' represents the vector 56 that is added in a parallel-offset manner to the end of the vector 58. The direction 60 of the total field that can be ascertained by the magnetoresistive sensor 12 illustrated in FIG. 1 originates from an origin of the coordinate system. If the magnitude of the vector is known then it is possible by means of vector addition of the vector 58 and the parallel-shifted vector 56' to ascertain the alignment of the vector 56 in dependence upon the alignment 60 of the total magnetic field and the magnitude of the vector 56 if an alignment and a magnitude of the interference vector 58 that represents the interference magnetic field is known.

A vector 59 is also illustrated that represents a magnitude of a magnetic field of the sensor magnet 6 shown in FIG. 1, which magnitude has not been ascertained precisely.

If the magnitude of the vector of the sensor magnetic field is not ascertained precisely by means of the Hall sensors, then the result is an incorrect alignment of the sensor magnetic field on the previously described vector calculation, in particular according to mathematical rules for complex phasors, which incorrect alignment is represented by an alignment of the vector 59.

A quadrature signal is advantageously formed by the processing unit 20 shown in FIG. 1 for the purpose of precisely ascertaining the vector 56 of the sensor magnetic field from the rotor position signals of the Hall sensors 14 and 16. In a further advantageous manner, at least one of the Hall sensors 14 and 16 can be a temperature-compensated Hall sensor for the purpose of precisely ascertaining the vector 56.

Figure 3:
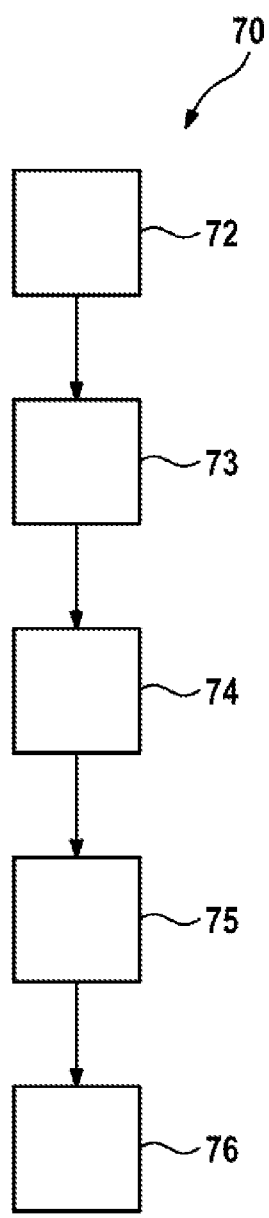
FIG. 3 illustrates an example for a method for operating an electronically commutated electric motor.

FIG. 3 illustrates a method 70 for operating an electronically commutated electric motor. In a step 72, an interference field that is caused at least by electrical components of the electric motor is ascertained and an interference field vector is generated, which interference field vector represents the interference field. In a step 73, a sensor magnetic field of a sensor magnet that is connected to a rotor of the electric motor is ascertained and a vector is generated and stored, which vector represents the sensor magnetic field, at least said vector represents the magnitude of the sensor magnetic field. In a step 74, a total magnetic field is ascertained, which total magnetic field represents the superposition of the interference magnetic field onto the sensor magnetic field.

In a step 75, the direction of the sensor magnetic field is ascertained in dependence upon the total magnetic field that is ascertained in the step 74, in particular the direction of the total magnetic field and the vectors that are ascertained and stored in the steps 72 and 43.

In a step 76, the electric motor for generating a magnetic rotational field is controlled in dependence upon the rotor position that corresponds to the direction of the sensor magnetic field that is ascertained in the step 75.

The invention claimed is:

1. An electronically commutated electric motor comprising:
   a rotor;
   a stator;
   a control unit connected to the stator and configured to energize the stator so as to generate a rotating magnetic field;
   at least one Hall sensor configured to (i) ascertain at least one magnitude of a magnetic field that is generated by a sensor magnet connected to the rotor and (ii) generate a rotor position signal that represents the magnetic field; and
   at least one magnetoresistive sensor configured to (i) ascertain an alignment of a total magnetic field during a rotor revolution of the rotor and (ii) generate a rotor position signal that represents said alignment,
   wherein the total magnetic field comprises the sensor magnetic field and an interference magnetic field that is superimposed on said sensor magnetic field and is generated by at least electrical components of the electric motor, and
   wherein the control unit is connected at the input side to the rotor position sensors and is configured to ascertain the rotor position of the rotor in dependence upon the alignment of the total magnetic field, at least of a previously stored magnitude of the sensor magnetic field and a magnitude and an alignment of the interference magnetic field.

2. The electric motor as claimed in claim 1, wherein the electric motor comprises at least a further Hall sensor configured to ascertain the sensor magnetic field and generate a further rotor position signal that represents the rotor position, and wherein the Hall sensor and the further Hall sensor are arranged offset with respect to each other in the direction of the rotor revolution.

3. The electric motor as claimed in claim 2, in that wherein the Hall sensor and the further Hall sensor are arranged in an orthogonally offset manner with respect to each other in the direction of the rotor revolution.

4. The electric motor as claimed in claim 2, wherein one or more of the Hall sensor and the further Hall sensor is a temperature-compensated Hall sensor configured to generate a digital Hall sensor signal independently of a temperature of the temperature-compensated Hall sensor.

5. The electric motor as claimed in claim 4, wherein the temperature-compensated Hall sensor comprises an operating voltage that corresponds to an operating voltage of the control unit.

6. The electric motor as claimed in claim 2, wherein the control unit is configured to generate a total Hall sensor signal from the rotor position signals of the Hall sensor and of the further Hall sensor and ascertain the sensor magnetic field in dependence upon the total Hall sensor signal.

7. The electric motor as claimed in claim 6, wherein the total Hall sensor signal is configured as a quadrature signal.

8. The electric motor as claimed in claim 6, wherein the control unit is configured to ascertain the magnitude and alignment of the sensor magnetic field in dependence upon the total Hall sensor signal.

9. The electric motor as claimed in claim 2, wherein the control unit is configured to ascertain an alignment or in addition the magnitude of the total magnetic field in dependence upon the total Hall sensor signal.

10. The electric motor as claimed in claim 9, wherein the control unit is configured to ascertain the alignment or in addition the magnitude of the total magnetic field in dependence upon a quadrature signal.

11. A method for operating an electronic commutated electric motor including a rotor, a stator, and a control unit connected to the stator and configured to energize the stator so as to generate a rotating magnetic field, the method comprising:
   ascertaining via a Hall sensor and storing at least a magnitude of a sensor magnetic field that is generated by a sensor magnet connected to the rotor;
   ascertaining an alignment of a total magnetic field during a rotor revolution of the rotor by a magnetoresistive sensor and generating a rotor position signal that represents the alignment, the total magnetic field comprising the sensor magnetic field and an interference magnetic field that is superimposed on said sensor magnetic field and is generated at least by electrical components of the electric motor, and
   ascertaining an alignment of the sensor magnetic field by a vector calculation in dependence upon the ascertained alignment of the total magnetic field, the previously stored magnitude of the sensor magnetic field and a magnitude and an alignment of the interference magnetic field.

12. The method as claimed in claim 11, further comprising:
   ascertaining via a further Hall sensor the sensor magnetic field;
   generating a further Hall sensor signal; and
   forming a total Hall sensor signal from the Hall sensor signal and the further Hall sensor signal, the total Hall sensor signal representing the sensor magnetic field.

13. The method as claimed in claim 12, wherein the total Hall sensor signal is a quadrature signal.

14. The electric motor as claimed in claim 1, wherein the rotor is configured as a permanent magnet rotor.

15. The method as claimed in claim 11, wherein the magnitude of the sensor magnetic field is ascertained and stored in a currentless state of the stator.

* * * * *